United States Patent [19]

Price et al.

[11] Patent Number: 4,560,195
[45] Date of Patent: Dec. 24, 1985

[54] AIR DEFLECTOR FOR TRAILERS

[75] Inventors: William F. Price; Phillip L. Emery, both of Portage, Wis.

[73] Assignee: Penda Corporation, Portage, Wis.

[21] Appl. No.: 509,937

[22] Filed: Jul. 1, 1983

[51] Int. Cl.⁴ .............................................. B62D 35/00
[52] U.S. Cl. ........................................ 296/1 S; 296/91
[58] Field of Search ................... 296/1 S, 91; 105/2 R

[56] References Cited

U.S. PATENT DOCUMENTS

| | | | |
|---|---|---|---|
| 3,415,566 | 12/1968 | Kerrigan | 296/1 S |
| 3,814,472 | 6/1974 | Zelikovitz | 296/1 S |
| 4,030,799 | 6/1977 | Johnson | 296/91 X |
| 4,036,519 | 7/1977 | Servais et al. | 296/91 X |
| 4,103,957 | 8/1978 | Landry et al. | 296/1 S |
| 4,135,754 | 1/1979 | FitzGerald et al. | 296/1 S |
| 4,210,354 | 7/1980 | Canning | 296/1 S |

FOREIGN PATENT DOCUMENTS

| | | | |
|---|---|---|---|
| 2509681 | 7/1981 | France | 296/1 S |
| 8002188 | 4/1980 | Netherlands | 296/1 S |

Primary Examiner—Robert B. Reeves
Assistant Examiner—Russell D. Stormer
Attorney, Agent, or Firm—Isaksen, Lathrop, Esch, Hart & Clark

[57] ABSTRACT

An air deflector for trailers having a forwardly facing front wall. The air deflector includes a body adapted to extend between the side edges of the trailer front wall and from the top edge thereof to a selected location on the front wall remote from the top edge. The body projects forwardly from the front wall with the forwardly facing surface of the body being generally convex. At least one air vent is located at the bottom margin of the body and is adapted to admit air between the body and the front wall of the trailer. In certain embodiments a resilient recoil rib is attached to the body, extending generally parallel and adjacent to the rearwardly facing surface of the body and between the top and bottom margins of the body. The recoil rib is adapted to increase the body's ability to resist deformation from force applied to the forwardly facing surface of the body and, upon release of such force, to aid the body to resume its original shape.

13 Claims, 8 Drawing Figures

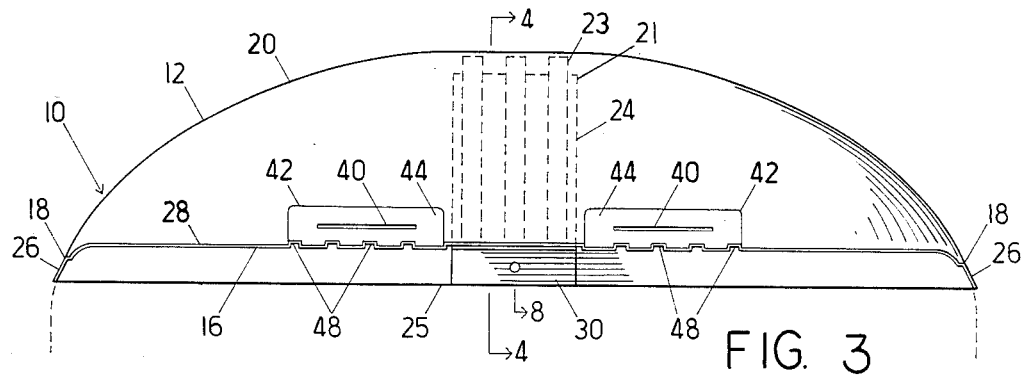
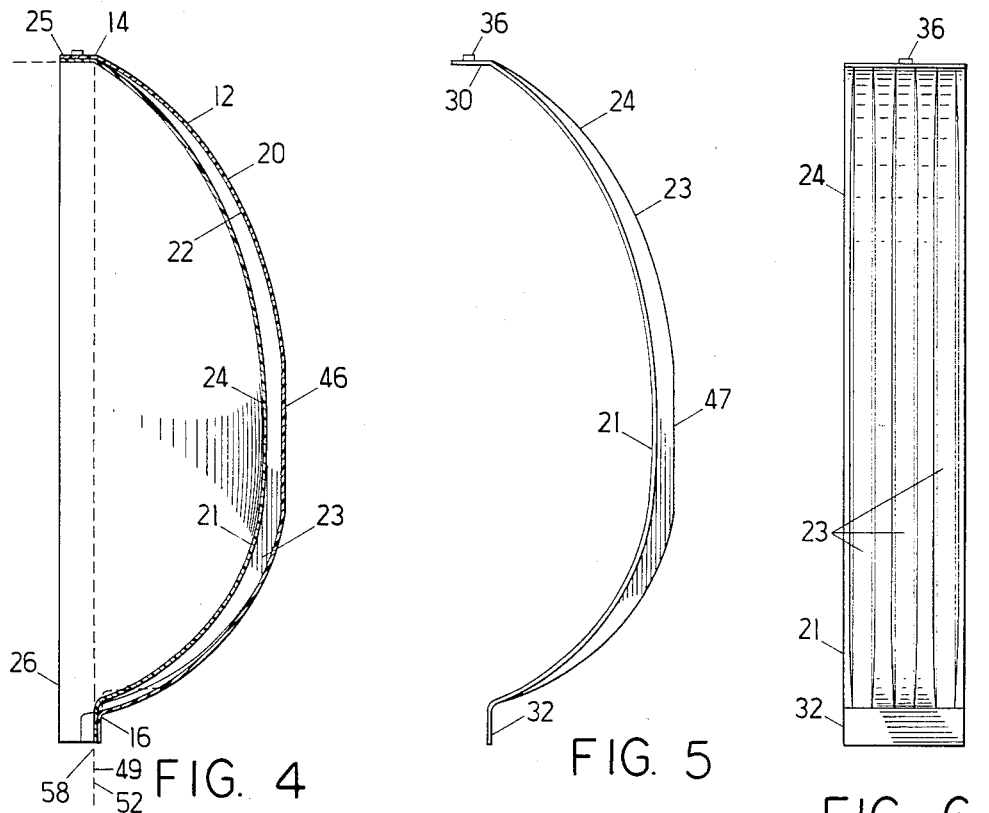
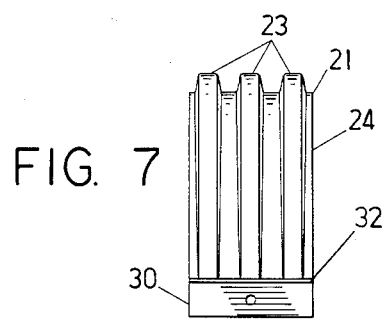
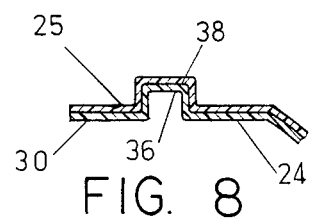

AIR DEFLECTOR FOR TRAILERS

TECHNICAL FIELD

The present invention relates to streamlining devices for land vehicles in general and, in particular, to air deflectors for truck bodies and trailers.

BACKGROUND OF ART

The art is cognizant of the desirability of reducing air drag on the blunt, forwardly facing surfaces of truck bodies and trailers. A variety of air deflectors have been developed to accomplish this end. Examples include the devices shown in U.S. Pat. Nos. 2,514,695; 3,415,566; 3,866,967; 4,021,069; 4,030,779; 4,068,883; 4,098,534; 4,135,754; 4,210,354; and 4,310,192. The referred to patents all show air deflectors fastened to the forwardly facing wall of a truck trailer or a truck body. All of the structures shown present contoured or angled surfaces to the airstream impinging upon the deflector generally from the front as the truck moves down the highway.

Air deflectors must have a sufficient strength to withstand the force of the airstream directed against them. Such strength has been achieved in several ways. The deflectors shown in the patents referred to include deflectors made of intrinsically rigid material and inflated deflectors that employ air pressure within a bubble-like deflector to achieve the same purpose. U.S. Pat. No. 4,068,883 shows the use of a brace supporting a rigid, vane-like deflector from behind, the brace itself being rigid and supported by the cab and the front of the cargo compartment of a single chassis truck.

In addition to being subjected to wind pressures, such deflectors are often accidentally struck by solid objects. Thus, surrounding structures at a loading dock, garage doors, and the like may be struck by the truck. Deflectors made of overly rigid or nonresilient materials can be permanently damaged by even relatively minor blows.

High density polyethylene is a desirable material for molding air deflectors. It is inexpensive, durable, flexible and resilient enough to endure a considerable amount of impact and other physical abuse. However, an air deflector molded from high density polyethylene and made thin enough to be desirably inexpensive, resilient, and flexible may be subject to deformation by excessive wind forces on the highway. Furthermore, under certain circumstances, the flow of air past sideways or rearwardly oriented openings between the deflector and the parts of the truck on which it is mounted can aspirate air from the interior of the deflector, creating a slight vacuum that may encourage collapse or other deformation of the deflector when subjected to highway wind forces.

BRIEF SUMMARY OF THE INVENTION

The present invention is summarized in that an air deflector for trailers having a forwardly facing front wall with a top edge and opposed side edges includes a body made of a strong, resilient, flexible sheet material. The body has opposed top and bottom and opposed side margins and substantially parallel forwardly and rearwardly facing surfaces extending to the margins of the body. The body is adapted to extend generally between the side edges of the trailer front wall and from the top edge thereof to a selected point of the front wall remote from the top edge. The body projects forwardly from the front wall for a selected distance with the forwardly facing surface being generally convex and extending forwardly from each margin of the body. At least one air vent is located generally at the bottom margin of the body and is adapted to admit air between the body and the front wall of the trailer.

A primary object of the invention is to provide an air deflector for trucks and trailers that reduces the aerodynamic drag experienced by the cargo box of the truck or of the trailer of a tractor-trailer combination as it is moved through the air.

A second object of the invention is to provide an air deflector that may be molded from high density polyethylene and the like, with structural dimensions thin enough to provide for economical manufacture, light weight, strength, resiliency, and flexibility.

Another object of the invention is to provide means for reinforcing a molded air deflector to resist force exerted on it by the air flowing over the deflector as the truck on which it is mounted moves down the road.

A further object of the invention is to provide such support by a means that allows for the support to flexibly yield when the deflector is struck by solid objects or the like and then to rebound, restoring the deflector to its original shape.

Another object of the invention is to provide for air circulation through the interior of a generally closed air deflector to ensure the evaporation of collected moisture, avoid the creation of a partial vacuum within the air deflector, and supply air to ventilators mounted in the forwardly facing wall of the cargo carrying compartment of the truck or the forwardly facing wall of the trailer.

Other objects, features, and advantages of the invention will be apparent from the following detailed description taken in conjunction with the accompanying drawings showing a preferred embodiment of an air deflector for trailers exemplifying the principles of the invention.

BRIEF DESCRIPTION OF THE DRAWINGS

FIG. 3 is a bottom plan view of the air deflector of FIG. 2.

FIG. 4 is a cross sectional view of the air deflector of FIG. 2 taken along section line 4—4 of FIG. 3.

FIG. 5 is a side elevation view of a recoil rib.

FIG. 6 is a front elevation view of the rib of FIG. 5.

FIG. 7 is a bottom plan view of the rib of FIG. 5.

FIG. 8 is a cross sectional view of a broken away portion of the air deflector of FIG. 2 taken along section line 8—8 of FIG. 3.

DETAILED DESCRIPTION OF THE PREFERRED EMBODIMENT

Figure 1:
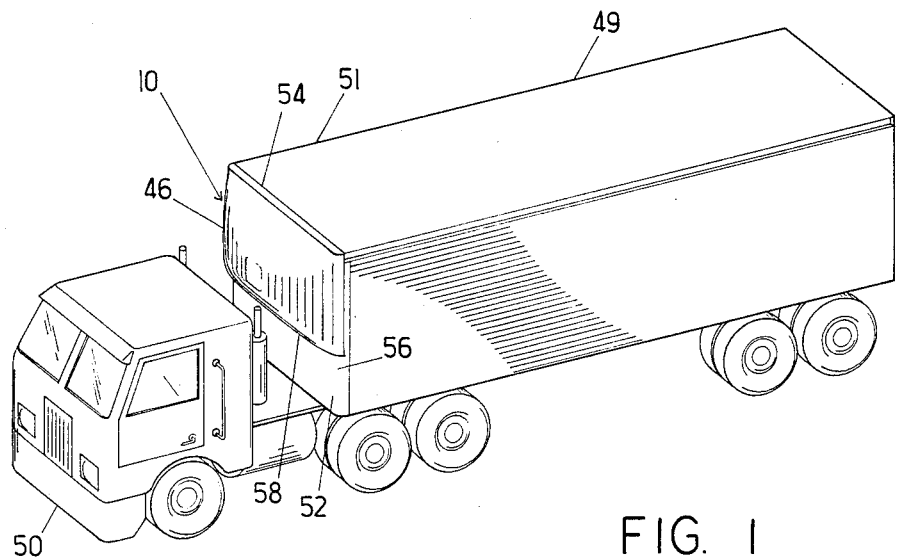
FIG. 1 is a perspective view of an air deflector made in accord with the present invention mounted on the trailer of a tractor-trailer unit.

Referring more particularly to the drawings, wherein like numbers refer to like parts, FIG. 1 shows an air deflector, generally indicated at 10, constructed in accord with the present invention. The air deflector 10 has a body 12. The body has opposed top and bottom margins 14, 16 and opposed side margins 18. The top, bottom, and side margins 14, 16, 18 all lie generally in a common plane and define a rectangle.

The body 12 is made of a strong, resilient, flexible sheet material. The body has substantially parallel, forwardly and rearwardly facing surfaces 20, 22 and projects forwardly from the plane in which the top, bottom, and side margins 14, 16, 18 lie, with the forwardly facing surface 20 being generally convex. The forwardly facing surface 20 smoothly extends forwardly from each margin 14, 16, 18 of the body 12.

A bowed recoil rib 24 extends generally parallel and adjacent to the rearwardly facing surface 22 of the body 12. Preferably the recoil rib 24 is molded separately from the body 12 from a single layer of resilient sheet material. However, a recoil rib 24 unitarily molded with the body 12 or otherwise formed would be within the scope and spirit of the invention. The recoil rib 24 extends from a selected margin of the body 12 to the margin opposed thereto. Preferably, the recoil rib 24 extends from the top margin 14 to the bottom margin 16. The recoil rib 24 is attached to the body 12 at each end of the recoil rib. Preferably the recoil rib 24 has a base 21, extending the length of the recoil rib, and a plurality of longitudinally extending stiffener ribs 23. The stiffener ribs 23 project above the base 21 and extend for a selected portion of the length of the recoil rib 24. The stiffener ribs 23 are adapted to resiliently increase the resistance of the recoil rib 24 to being flexed.

A side mounting flange 26 extends rearwardly from each of the side margins 18 of the body 12, and a top mounting flange 25 extends rearwardly from the top margin 14. A bottom mounting flange 28 extends downwardly from the bottom margin 16. Preferably, one end of the recoil rib 24 has a top mounting extension 30 adapted to extend under the top mounting flange 25 from the center of the top margin 14. The recoil rib 24 likewise has a bottom mounting extension 32. The bottom mounting extension 32 extends parallel to the plane of the top, bottom, and side margins 14, 16, 18, to extend under and adjacent to the bottom mounting flange 28.

Preferably, the top mounting flange 25 has a rib seat 34 adapted to snugly engage the top mounting extension 30 of the recoil rib 24. The rib seat 34 has a depth selected to be substantially the same as the thickness of the top mounting extension 30, so that the under side of the top mounting extension 30 is flush with the under side of the top mounting flange 25. The top mounting extension 30 preferably has an upwardly extending locator peg 36, and the under side of the rib seat 34 has a corresponding locator pocket 38 adapted to receive the locator peg. When the top mounting extension 30 is in place within the rib seat 34, the locator peg 36 matingly engages the locator pocket 38, effectively preventing the top of the recoil rib 24 from moving relative to the body 12.

It is preferable that the forward-most portion of the forwardly facing surface 20 be flat, as is indicated at 46. The correspondingly flat portion of the rearwardly facing surface 22 then provides a surface against which a flattened foward-most portion 47 of the recoil rib can reliably make contact. By this means, the pressure of the recoil rib 24 may be distributed over a large area of the body 12 without the recoil rib having to be precisely molded to the exact curve of the rearwardly facing surface 22.

The body 12 includes at least one air vent 40 extending therethrough from the forwardly facing surface 20 to the rearwardly facing surface 22. Preferably the air vent 40 is located adjacent to the bottom margin 16 of the body 12. In the preferred embodiment, the body 12 includes two air vent alcoves 42. The air vent alcoves 42 are located at either side of the recoil rib 24, adjacent to the bottom margin 16 of the body 12. The alcoves have a substantially horizontal ceiling 44 extending rearwardly beneath the overhanging body 12, and an air vent 40, which extends through the ceiling of each alcove. By this means, the air vent 40 opens downwardly so that rainwater and the like running down over the body 12 does not enter the air vent.

The bottom mounting flange 28 includes moisture drains 48. The moisture drains 48 have channels extending on the rearward side of the bottom mounting flange 28 from the rearwardly facing surface 22 to the furthermost extension of the bottom mounting flange. Thus, the moisture drains 48 provide a route by which any moisture that does collect within the body 12 may drain therefrom.

Provision may be made for attaching conventional running lights 29 to the body 12, painting signs on the body, or the like.

In its use, the air deflector 10 is adapted to be attached to a trailer 49 that combines with a tractor 50 to form a conventional tractor-trailer unit 51, as can be best seen in FIG. 1. Such a trailer 49 commonly has a front wall 52 having a top edge 54 and opposed side edges 56. The body 12 of the air deflector 10 is adapted to extend generally between the side edges 56 of the trailer front wall 52 and from the top edge 54 thereof to a selected location 58 remote from the top edge 54 and below the uppermost parts of the bulky portions of the tractor 50.

Only one version of a trailer 49 is shown in the drawings. Of course, such trailers come in many models, from various manufacturers. The shapes of corners, ribbing, edges, and the like differ from model to model. The flexibility of the body 12 and particularly of the top and side mounting flanges 25, 26 allows a minimal number of models of the air deflector 10 to be sufficient to allow a suitable air deflector to be adapted and attached to trailers 49 having a variety of top and side edge 56 shapes and other trailer contours. In contrast, air deflectors made of rigid materials are less adaptable, requiring many specially designed models to accommodate the same group of differing trailers 49.

Figure 2:
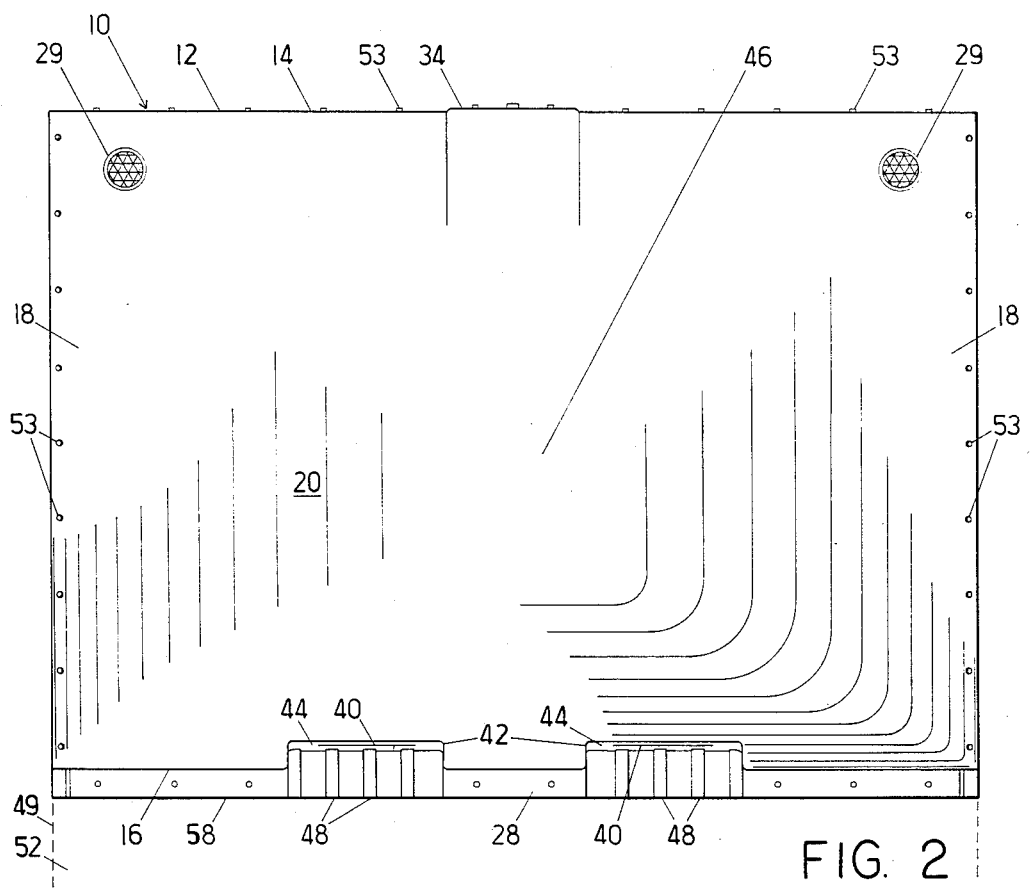
FIG. 2 is a front elevation view of the air deflector of FIG. 1 mounted on a trailer, which is shown in phantom.

Preferably, the body 12 is fastened in place over the front wall 52 with screws 53 (shown in FIG. 2), rivets, bolts, or other fasteners that extend through the mounting flanges 25, 26, 28 and into the trailer 49. A selected mastic or caulking may be used instead of or in addition to other fasteners to seal the body 12 to the trailer 49 in generally air and water tight relation. The top and bottom mounting extensions 30, 32 of the recoil rib 24 are held firmly between the top and bottom mounting flanges 25, 28 respectively of the body 12 and the surfaces of the trailer 49 on which the body is mounted. Preferably some of the screws, rivets, or other fasteners extend both through the body mounting flanges and the rib mounting extensions beneath them to secure the ends of the recoil rib 24.

Commonly, trailers 49 have surface mounted reinforcement members and other irregularities that may cause side or rearwardly opening gaps to exist between the mounting surfaces of the trailer and the surfaces of a mounted air deflector. As the tractor-trailer unit moves down the highway, the air rushing past such openings tends to evacuate the air from the space between the trailer surface and the mounted deflector, forming a partial vacuum. This vacuum can be sufficient to contribute to deformation or even collapse of a deflector body under severe wind conditions, interfering with its aerodynamic qualities.

With the air deflector 10 of the invention, air flows over the air deflector, smoothly passing across the body 12 to be directed along the trailer 49 with a minimum of turbulence. At the bottom margin 16 of the body 12, air deflected from the lower part of the air deflector 10 meets the front wall 52, causing an air pressure to develop that is in excess of that of the ambient atmosphere. As a consequence, air flows into the air vents 40, charging the space between the body 12 and the front wall 52 with air and relieving any vacuum that may tend to form as a consequence of the air evacuation mechanism discussed above. In addition, the recoil rib 24 both resists any tendency of the body 12 to collapse and ensures that the body returns to its original shape in the event that any such deformation occurs as a consequence of extreme conditions.

Some trailers 49 have trailer ventilation ports and the like (not shown) located in the upper parts of the front wall 52 of the trailer. The use of an air deflector with such trailers has been disadvantageous because of the interference by the air deflector with the ventilation ports. However, the air deflector 10 of the invention having air vents 40 functioning in the manner disclosed above may be used in such a situation, the air vents providing a sufficient air passage between the body 12 and the front wall 52 that ventilation ports mounted in the front wall of the trailer 49 can continue to function in a substantially unobstructed manner. Obviously, the size of the air vents 40 can be increased, if necessary, to meet the air flow requirements of such ventilation ports.

As is disclosed above, it is preferred that the air deflector 10 be made of a highly resilient and flexible material such as high density polyethylene that can be conveniently and economically molded to the desired shape by conventional thermoforming techniques. In thermoforming, a hot sheet of plastic material is placed over a mold and pulled tightly against it by a vacuum drawn between the plastic and the mold, causing the plastic to conform to the shape of the mold. The plastic is then cooled to allow it to set in its new shape and is discharged from the mold. However, other material, both rigid and resilient, and flexible and inflexible, and other means of creating the shape of the air deflector 10 disclosed above, are possible and would be within the scope and spirit of the invention. The recoil rib 24 and air vents 40 have a special utility when used in an air deflector 10 made of a resilient, flexible material. However, it is apparent that the recoil rib 24 would provide useful strength in an air deflector 10 made of any material. Similarly, the air vents 40 have a utility independent of the flexibility or the resilient character of the air deflector 10 in that they charge the air deflector with air, allowing the use of the air deflector with trailers 49 having ventilation ports and the like located in the upper portion of the front wall 52 of the trailer.

The air deflector 10 has been described in the context of a tractor-trailer unit 51. It will be apparent, however, that the air deflector 10 has a like utility and function when attached to the cargo box of a single chassis truck (not shown) the front wall of which extends above the bulky portions of the cab of the truck.

It is understood that the present invention is not limited to the particular construction and arrangement of parts illustrated and disclosed, nor to the particular materials disclosed herein. Instead, it embraces all such modified forms thereof as come within the scope of the following claims.

What is claimed is:

1. An air deflector for trailers having a forwardly facing front wall with a top edge and opposed side edges, the air deflector comprising:
    (a) a body of resilient, flexible, semi-rigid thermoplastic material molded to a desired set shape and having opposed top and bottom margins and opposed side margins and forwardly and rearwardly facing surfaces extending to the margins of the body, the body being adapted to extend generally between the side edges of the trailer front wall and from the top edge thereof to a selected location on the front wall remote from the top edge, the body projecting forwardly from the margins with the forwardly facing surface being generally convex; and
    (b) at least one air vent alcove located at the bottom margin of the body having a downwardly facing and substantially horizontal ceiling portion extending rearwardly beneath the overhanging body, and an air vent located in the ceiling portion of the air vent alcove for freely admitting ambient air to the space between the body and the trailer front wall and thereby preventing formation of a vacuum therein which might tend to cause collapse of the body, and
    (c) a recoil rib attached to the body at least at each end of the recoil rib and extending generally parallel and adjacent to the shaped rearwardly facing body surface from a selected margin of the body to the margin opposed thereto, the recoil rib being formed of resilient, semi-rigid material to thereby increase the body's ability to resist deformation from force applied to the forwardly facing surface of the body and, upon the release of such force, to aid the body to resume its original shape.

2. The air deflector specified in claim 1 wherein the recoil rib extends between the top and bottom margins of the body.

3. The air deflector specified in claim 1 wherein the recoil rib is unitarily molded as part of the body.

4. The air deflector specified in claim 1 wherein the recoil rib is molded separately from the body and has a flattened, forward-most portion, and the forward-most portion of the rearwardly facing surface is flat and adapted to receive the flattened portion of the recoil rib in abutting relation, whereby pressure from the recoil rib may be distributed over a large area of the body without the recoil rib having to be precisely molded to the exact curve of the inwardly facing surface.

5. An air deflector for trailers having a forwardly facing front wall with a top edge and opposed side edges, the air deflector comprising:
    (a) a body having opposed top and bottom margins and opposed side margins and forwardly and rearwardly facing surfaces extending to the margins of the body, the body being adapted to extend generally between the side edges of the trailer front wall and from the top edge thereof to a selected location on the front wall remote from the top edge, the body projecting forwardly from the margins with the forwardly facing surface being generally convex; and
    (b) at least one air vent located at the bottom margin of the body having a downwardly facing and substantially horizontal ceiling portion extending rearwardly beneath the overhanging body, and an air vent located in the ceiling portion of the air vent alcove to admit air between the body and the front wall of the trailer, whereby rainwater running over the body will not tend to enter the air vent; and (c) a resilient recoil rib attached to the body at least at each end of the recoil rib and extending generally parallel and adjacent to the rearwardly facing surface from a selected margin of the body to the margin opposed thereto to increase the body's ability to resist deformation from force applied to the forwardly facing surface of the body and, upon the release of such force, to aid the body to resume its original shape, the recoil rib having a base extending the length of the recoil rib and a plurality of longitudinally extending stiffener ribs projecting above the base and extending for a selected portion of the length of the recoil rib to resiliently increase the resistance of the recoil rib to being flexed.

6. An air deflector for trailers having a forwardly facing front wall with a top edge and opposed side edges, the air deflector comprising:

(a) a body made of a resilient, flexible sheet material, the body having opposed top and bottom and opposed side margins and substantially parallel forward and rearwardly facing surfaces extending to the margins of the body, the body being adapted to extend generally between the side edges of the trailer front wall and from the top edge thereof to a selected location on the front wall remote from the top edge, the body projecting forwardly from the margins with the forwardly facing surface being generally convex;

(b) at least one air vent located generally at the bottom margin of the body and adapted to admit air between the body and the front wall of the trailer; and (c) a resilient recoil rib formed from a layer of resilient sheet material extending generally parallel and adjacent to the rearwardly facing surface from the top margin of the body to the bottom margin thereof, the recoil rib being attached to the body at least at each end of the recoil rib, the recoil rib having a plurality of longitudinally extending stiffener ribs formed as alternating ridges extending upwardly from a base portion, the front surfaces of the stiffener ribs extending generally parallel and adjacent to the rearwardly facing surface of the body.

7. The air deflector specified in claim 6 wherein the body includes an air vent alcove located at the bottom margin thereof having a downwardly facing and substantially horizontal ceiling portion extending rearwardly beneath the overhanging body, and wherein the air vent is located in the substantially horizontal ceiling portion of the air vent alcove and opens downwardly.

8. The air deflector specified in claim 6 wherein the recoil rib has a flattened, forward-most portion, and the forward-most portion of the rearwardly facing surface is flat and adapted to engage the flattened portion of the recoil rib in abutting relation, whereby pressure from the recoil rib may be distributed over a large area of the body without the recoil rib having to be precisely molded to the exact curve of the rearwardly facing surface.

9. An air deflector for trailers having a forwardly facing front wall with a top edge and opposed side edges, the air deflector comprising:

(a) a body made of resilient, flexible sheet material having opposed top and bottom margins and opposed side margins and forwardly and rearwardly facing surfaces extending to the margins of the body, the body being adapted to extend generally between the side edges of the trailer front wall and from the top edge thereof to a selected location on the front wall remote from the top edge, the body projecting forwardly from the margins with the forwardly facing surface being generally convex; and (b) a resilient recoil rib formed from a layer of resilient sheet material attached to the body at least at each end of the recoil rib and extending generally parallel and adjacent to the rearwardly facing surface from a selected margin of the body to the margin opposed thereto to increase the body's ability to resist deformation from force applied to the forwardly facing surface of the body and, upon release of such force, to aid the body to resume its original shape, the recoil rib having a plurality of longitudinally extending stiffener ribs formed as alternating ridges extending upwardly from a base portion, the front surfaces of the stiffener ribs extending generally parallel and adjacent to the rearwardly facing surface of the body.

10. The air deflector specified in claim 9 wherein the recoil rib extends between the top and bottom margins of the body.

11. The air deflector specified in claim 9 wherein the recoil rib has a flattened, forward-most portion, and the forward-most portion of the rearwardly facing surface is flat and adapted to engage the flattened portion of the recoil rib in abutting relation, whereby pressure from the recoil rib may be distributed over a large area of the body without the recoil rib having to be precisely molded to the exact curve of the inwardly facing surface.

12. An air deflector for trailers having a forwardly facing front wall with a top edge and opposed side edges, the air deflector comprising:

(a) a body of resilient, flexible, semi-rigid thermoplastic material molded to a desired set shape and having opposed top and bottom margins and opposed side margins and forwardly and rearwardly facing surfaces extending to the margins of the body, the body being adapted to extend generally between the side edges of the trailer front wall and from the top edge thereof to a selected location on the front wall remote from the top edge, the body projecting forwardly from the margins with the forwardly facing surface being generally convex; and (b) a recoil rib extending generally parallel and adjacent to the rearwardly facing surface of the body from a selected margin of the body to the margin opposed thereto, the recoil rib being formed as an elongated strip of resilient, semi-rigid material to thereby increase the body's ability to resist deformation from force applied to the forwardly facing surface of the body and, upon the release of such force, to aid the body to resume its original shape, the forward-most portion of the recoil rib substantially closely engaging the most forwardly projecting portion of the body, whereby the pressure of support provided by the recoil rib to the body will tend to be distributed over the recoil rib and body.

13. An air deflector for trailers having a forwardly facing front wall with a top edge and opposed side edges, the air deflector comprising:

(a) a body having opposed top and bottom margins and opposed side margins and forwardly and rearwardly facing surfaces extending to the margins of the body, the body being adapted to extend generally between the side edges of the trailer front wall and from the top edge thereof to a selected location on the front wall remote from the top edge, the body projecting forwardly from the margins with the forwardly facing surface being generally convex; and (b) a resilient recoil rib extending generally parallel and adjacent to the rearwardly facing surface of the body from a selected margin of the body to the margin opposed thereto to increase the body's ability to resist deformation from force applied to the forwardly facing surface of the body and, upon the release of such force, to aid the body to resume its original shape, the forward-most portion of the recoil rib substantially closely engaging the most forwardly projecting portion of the body, whereby the pressure of support provided by the recoil rib to the body will tend to be distributed over the recoil rib and body, the recoil rib being formed from a layer of resilient sheet material and having a plurality of longitudinally extending stiffener ribs formed as alternating ridges extending upwardly from a base portion, the front portion of the stiffener ribs extending generally parallel and adjacent to the rearwardly facing surface of the body.

* * * * *